(12) United States Patent
Nakanishi

(10) Patent No.: US 6,213,383 B1
(45) Date of Patent: Apr. 10, 2001

(54) METHOD OF CONSOLIDATING NI-TI ALLOY PARTS IN A PAIR OF SPECTACLES

(75) Inventor: Eiichi Nakanishi, Hyogo (JP)

(73) Assignee: Nakanishi Optical Corporation, Osaka (JP)

( * ) Notice: Subject to any disclaimer, the term of this patent is extended or adjusted under 35 U.S.C. 154(b) by 0 days.

(21) Appl. No.: 09/450,378

(22) Filed: Nov. 29, 1999

(30) Foreign Application Priority Data

Jun. 9, 1999 (JP) .................................. 11-162255

(51) Int. Cl.[7] ............... B23K 31/02; B23K 1/19; G02C 13/00
(52) U.S. Cl. ............. 228/175; 228/262.3; 228/262.71; 351/41; 351/178
(58) Field of Search ............... 228/175, 262.3, 228/262.71, 173.5; 351/41–178

(56) References Cited

U.S. PATENT DOCUMENTS

| | | | |
|---|---|---|---|
| 4,432,616 | * | 2/1984 | Kurosaka ................. 351/106 |
| 4,450,210 | * | 5/1984 | Takamura et al. ......... 428/660 |
| 4,466,713 | * | 8/1984 | Tanaka .................... 351/106 |
| 4,494,831 | * | 1/1985 | Yaguchi et al. ........... 351/41 |
| 4,952,044 | * | 8/1990 | Murai ..................... 351/41 |
| 5,150,136 | * | 9/1992 | Nakanishi ................ 351/111 |
| 6,077,368 | * | 6/2000 | Nakamura et al. ........ 148/563 |

FOREIGN PATENT DOCUMENTS

| | | | |
|---|---|---|---|
| 358179818 | * | 10/1983 | (JP) . |
| 358179819 | * | 10/1983 | (JP) . |
| 361173217 | * | 8/1986 | (JP) . |
| 361206579 | * | 9/1986 | (JP) . |
| 000450225A2 | * | 10/1991 | (JP) . |
| 405257090 | * | 10/1993 | (JP) . |
| 409005675 | * | 1/1997 | (JP) . |
| 10-282458 | * | 10/1998 | (JP) . |

* cited by examiner

Primary Examiner—Clifford C. Shaw
Assistant Examiner—Kiley Stoner
(74) Attorney, Agent, or Firm—Antonelli, Terry, Stout & Kraus, LLP

(57) ABSTRACT

A Ni—Ti alloy part (6) constituting a frame for a pair of spectacles is inserted in and then caulked to a bore (3) formed in a joint piece (2) that is made of a resistance-weldable or resistance-brazeable titanium material. The joint piece (2) has a weldable or brazeable portion (5) that is located remote from the bore (3). This piece (2) will subsequently be resistance welded or brazed to a skeleton member (7) also constituting the frame and made of the same or a different titanium material also weldable or brazeable, so that the Ni—Ti alloy part can firmly and reliably be secured to the skeleton member.

10 Claims, 4 Drawing Sheets

FIG.5
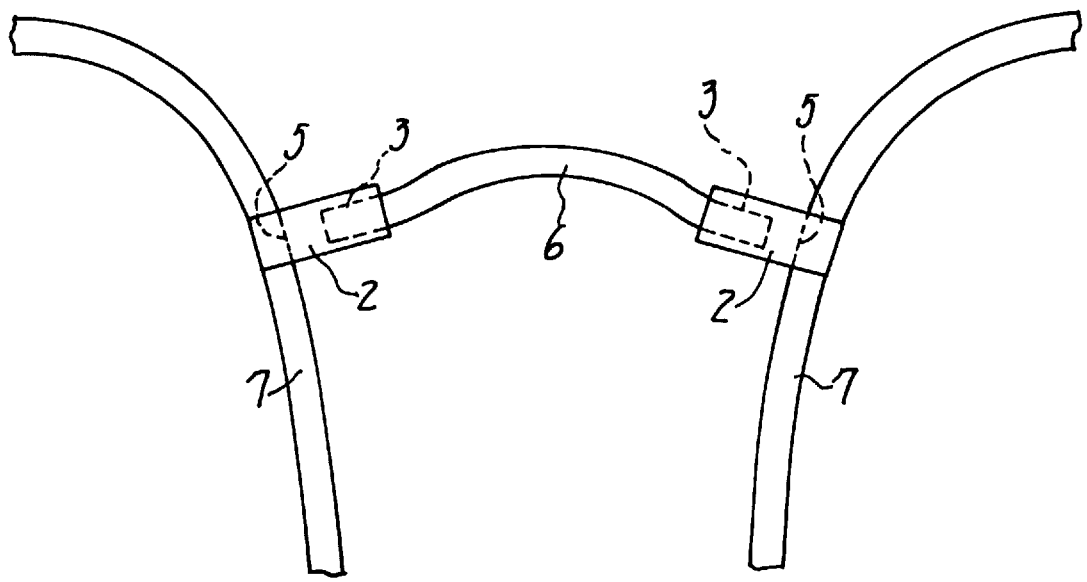
FIG.6 (a)
FIG.6 (b)
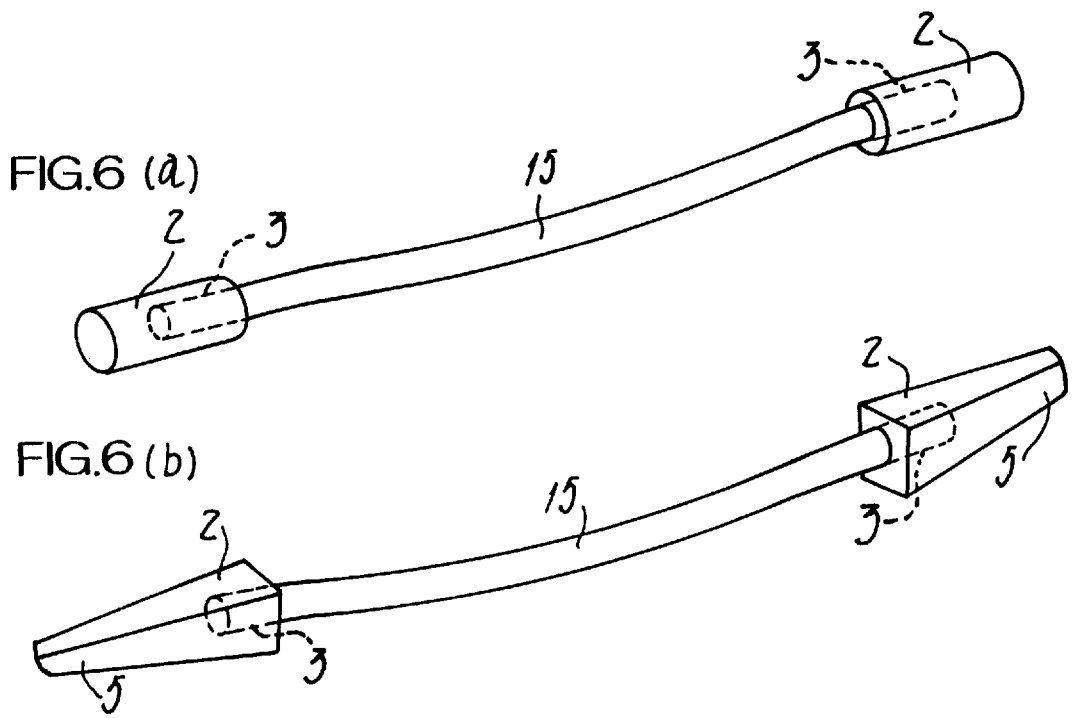

METHOD OF CONSOLIDATING NI-TI ALLOY PARTS IN A PAIR OF SPECTACLES

BACKGROUND OF THE INVENTION

1. Field of the Invention

The present invention relates to a method of consolidating some parts made of an appropriate "Ni—Ti alloy" with other constituent members so as to form a pair of spectacles, wherein the "Ni—Ti alloy" parts may include a bridge, a cross bar, temples (or earpieces) and the like desired to have a property of shape memory. The other members may be skeleton members such as lens rims, hinge webs or the like that are made of a "titanium material" not being of such a shape memory property. The "Ni—Ti alloys" are substantially composed each of nickel and titanium and are of the so-called "super-elastic" property. The other term "titanium material" defines herein a material selected from the group consisting of pure titanium and its alloys that are weldable and/or brazeable depending on conditions employed.

2. Prior Art

Generally, it is difficult for articles made of Ni—Ti alloys or some titanium materials to be brazed in a simple manner to each other or to any other metallic article. Therefore, some cylindrical joint pieces 22 made of a weldable metal (such as pure titanium) as shown in FIG. 8 have been used to get around such a difficulty. In the illustrated example, a bridge 21 is a Ni—Ti alloy part included in the framework of a pair of spectacles. One end of this bridge 21 is fitted in a bore 23 of the joint piece 22, with this bore having a blind bottom. Subsequently, a cylindrical wall of the joint piece 22 will be pressed or 'caulked' strongly in a centripetal direction to set the bridge end in place. Such a caulked cylindrical joint piece 22 may then be resistance-spot or butt resistance-welded to a lens rim 24 or the like made of a titanium material.

However, it is inevitable that small crevices or interstices exist between the Ni—Ti alloy part 21 and the inner periphery of the caulked joint piece 22 which is being resistance-welded to the lens rim 24. A high voltage will be applied to and through the part 21 and the piece 22 across the interstices, thus resistance welding them together at an elevated temperature. Electric sparks are likely to be emitted in the interstices due to the high voltage, thereby bringing about deformation of or cracks 25 in the joint piece. As a result, connection strength of the caulked members has often been impaired to an intolerable degree.

SUMMARY OF THE INVENTION

The present invention was made in view of the described drawbacks or inconvenience inherent in the prior art. An object of the present invention is therefore to provide a novel and improved method of consolidating Ni—Ti alloy parts with other spectacles frame-constituting members made of a titanium material, such that they may firmly and permanently be fixed to each other so as to build a reliable and defect-free framework for the pair of spectacles.

This object is solved by the method of claim 1. Further advantageous features, aspects and details of the invention are evident from the dependent claims.

In detail, the method proposed herein does comprise the steps of: preparing a Ni—Ti alloy part, a joint piece and a skeleton member, all constituting a framework for a pair of spectacles, wherein both the joint piece and the skeleton member are made of the same or different titanium materials that are fusion-bondable, and wherein the joint piece has at one end thereof a bore surrounded by a peripheral wall, the joint piece having the other end serving as a fusion-bondable portion that is located remote from the one end, next fitting an end of the Ni—Ti alloy part in the bore of the joint piece, subsequently sequently caulking the peripheral wall onto the end of the Ni—Ti alloy part, and finally fusion bonding the other end of the joint piece to the skeleton member.

The fusion-bondable portion is either a resistance-weldable portion or a resistance-brazeable portion, and the step of fusion bonding is either the step of resistance welding or resistance brazing the joint piece to the skeleton member.

Preferably, the joint piece may be a cylindrical article and the bore thereof may have a blind bottom, and the fusion-bondable portion of the joint piece may be after-treated into such a shape as facilitating the final step of resistance welding or resistance brazing the joint piece to the skeleton member, after the Ni—Ti alloy part has been inserted in the bore and the peripheral wall thereof has subsequently been caulked.

BRIEF DESCRIPTION OF THE DRAWINGS

FIG. 5 is a front elevation of the bridge that has been fusion bonded to the lens rims;

FIG. 6a shows a cross bar to which the present method is being applied at one step thereof in another example;

FIG. 6b shows the cross bar at the next step in this example;

THE PREFERRED EMBODIMENTS

Figure 1:
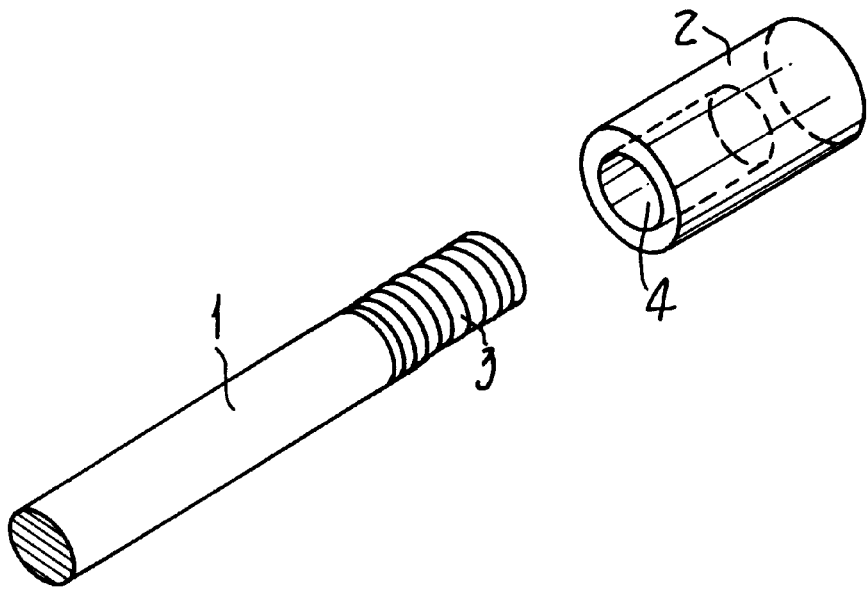
FIG. 1 is a perspective view of a Ni—Ti alloy wire and a joint piece that are used in combination in a method of the present invention so as to be consolidated with an adjacent member.
Figure 2:
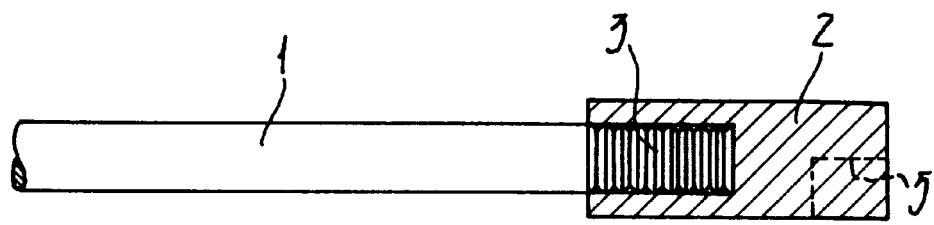
FIG. 2 is a front elevation of the joint piece and the adjacent member, with the latter being shown in vertical cross section.

Now, some preferable embodiments of the present method and examples of carrying out same will be described in detail referring to the drawings. A Ni—Ti alloy wire 1 shown in FIG. 1 is a raw material used to provide a bridge, a cross bar, temples or the like as constituent members of a pair of spectacles. The reference numeral 2 denotes a joint piece made of a titanium material. The Ni—Ti alloy wire 1 may be knurled at one end 3 thereof in annular direction so as to ensure the effect of caulking process discussed below. On the other hand, the joint piece 2 is a cylindrical article whose bore 4 has a blind bottom so that the knurled end of the Ni—Ti alloy wire 1 is fully received in this bore as shown in FIG. 2. A peripheral wall defining therein the bore 4 will then be pressed in a centripetal direction at the succeeding caulking step, whereby the wire's 1 end is fastened to the joint piece 2. Simultaneously with or subsequent to this caulking step, the other end opposite to and remote from the knurled and inserted end of the Ni—Ti wire may be machined or otherwise processed to form a fusion-bondable portion 5.

Figure 3:
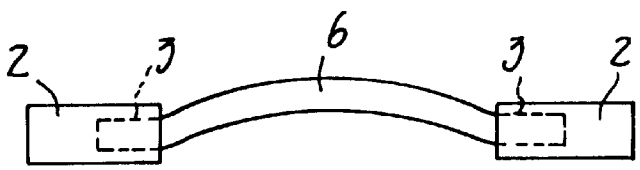
FIG. 3a shows a bridge to which the method of consolidating mating members is being applied at a preceding step of the method of the present invention.
FIG. 3b shows the bridge at succeeding step in the method.
Figure 3:
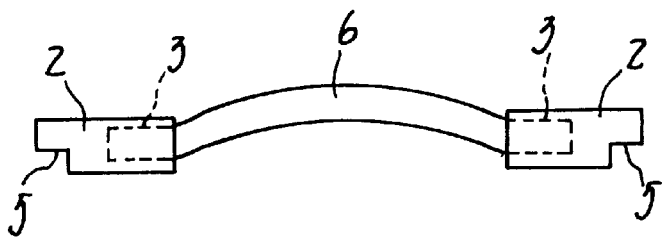

FIG. 3a shows an example, in which a bridge 6 is formed of such a Ni—Ti alloy wire 1 as described above so as to be one constituent member in a pair of spectacles. The joint pieces 2 will be fitted on and then forcibly caulked to both the ends of the bridge 6. Subsequently, cutouts intended to serve as the fusion-bondable portions 5 will be formed by machining each joint piece's end located remote from said bridge as will be seen in FIG. 3b.

Figure 4:
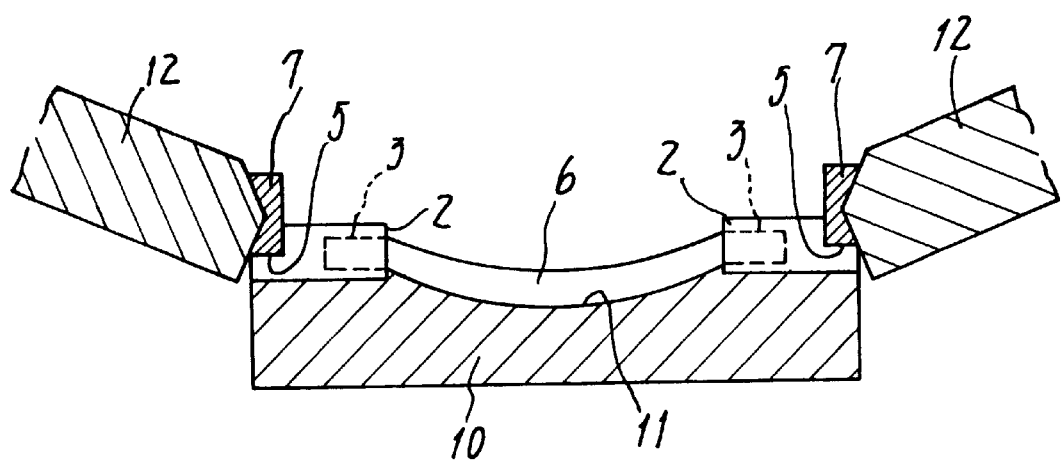
FIG. 4 shows a further stage wherein the bridge is being fusion bonded to lens rims.

FIG. 4 schematically shows a process wherein the bridge 6 is resistance welded at its ends covered with the joint pieces to a pair of lens rims 7 and 7 made of a titanium material. In this process, a base electrode 10 has formed therein a concave recess 11 to support the bridge 6, and the fusion-bondable portions 5 of the joint pieces 2 are set in place on the predetermined portions of the titanium material rims 7. A pair of complementary electrodes 12 will urge portions of these rims towards the bondable portions 5 while an electric current of a high voltage is fed through each pair of those mating portions. Areas of those mating portions in contact with each other will thus be heated to effect the welding or brazing thereof. As a result, an assembly shown in FIG. 5 will be provided wherein both the bridge ends are firmly connected by the joint pieces 2 to the respective lens rims 7.

FIG. 6a illustrates another example of the present method, wherein a cross bar 15 (to be disposed above the bridge and) made of the Ni—Ti alloy wire 1 shown in FIG. 1. Also in this example, two joint pieces 2 are fitted on and caulked to both ends of the cross bar. Subsequently, the cylindrical joint pieces 2 will be pressed into a truncated pyramidal shape as shown in FIG. 6b. Thus, fusion-bondable portions 5 are formed at and integral with opposite outer ends of the joint pieces intervened by the cross bar 15.

Figure 7A:
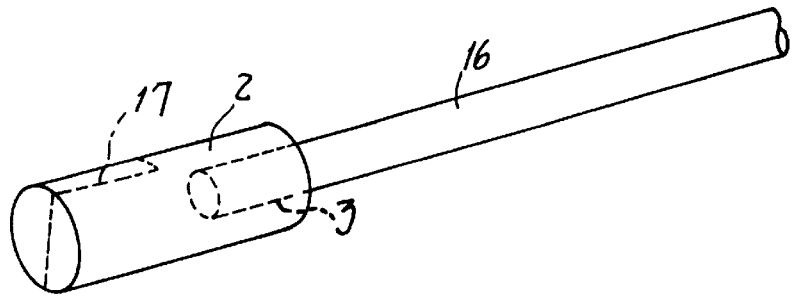
FIG. 7a shows a temple or earpiece to which also the present method is being applied at one step thereof in still another example.
Figure 7B:
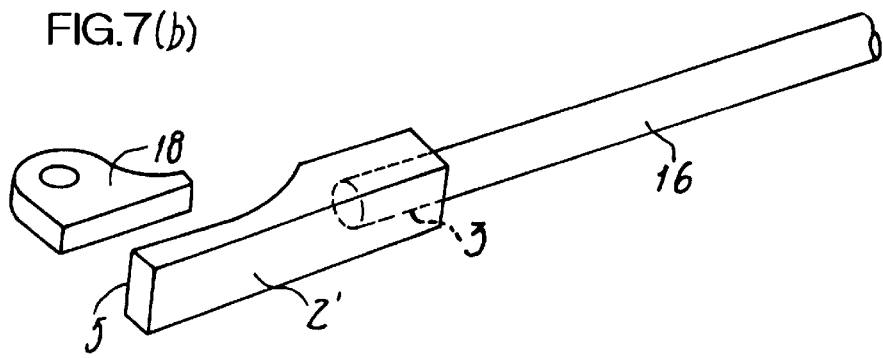
FIG. 7b shows the temple at the next step in this example.
Figure 8:
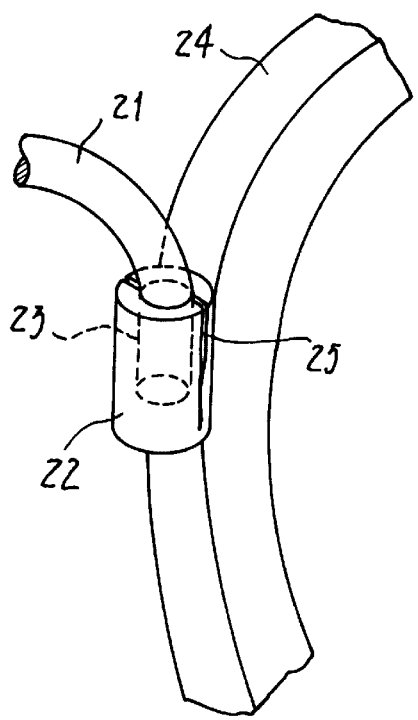
FIG. 8 is a perspective view of mating parts that are shown in part and have been consolidated by the prior art method.

FIG. 7a shows still another example, wherein a temple (i.e., earpiece) 16 made of the Ni—Ti alloy wire 1 shown in FIG. 1 has an end to which one end of a joint piece 2 has already been caulked. In this case, a preliminary cutout 17 machined at first at the other end of this joint piece 2 is located remote from the temple. Each joint piece 2 will further be pressed into a rectangular and columnar shape 2' so that its flat end serves as a fusion-bond-able portion 5 facing inwards in a finished state as shown in FIG. 7b. Finally, a web 18 of a hinge will be resistance welded to such a bondable portion 5.

It will now be apparent from the foregoing that the method of the present invention provides a fusion-bondable portion at and integral with one end of each joint piece, which piece is made of a titanium material. This fusion-bondable portion is located remote from the other end of the joint piece in which an end of the Ni—Ti alloy part is inserted and secured by the caulking technique. A high voltage current will never adversely affect strength and reliability of the connection, nor spoil the joint pieces in beauty in spite of the resistance welding thereof to another spectacles frame member made of the same or different titanium material.

What is claimed is:

1. A method of consolidating parts made of a Ni—Ti alloy of a super elasticity with other members included in a framework for a pair of spectacles, the method comprising the steps of:

preparing the Ni—Ti alloy part, a joint piece and a skeleton member, wherein both the joint piece and the skeleton member are made of a fusion-bondable titanium material, and all of these part, piece and member contribute to the framework, the joint piece having at one of its opposite ends a bore surrounded by a peripheral wall, the other end of the joint piece being designed to serve as a fusion-bondable portion located remote from the one end;

fitting an end of the Ni—Ti alloy part in the bore of the joint piece;

subsequently caulking the peripheral wall onto the end of the Ni—Ti alloy part; and fusion bonding the other end of the joint piece to the skeleton member.

2. The method as defined in claim 1, wherein the joint piece and the skeleton member are made of the same titanium material.

3. The method as defined in claim 1, wherein the joint piece and the skeleton member are made from different titanium materials.

4. The method as defined in any one of the preceding claims 1 to 3, wherein the fitting of the Ni—Ti alloy part in the bore of the joint piece and the subsequent caulking of the peripheral wall onto the end of the Ni—Ti alloy part are done before the fusion bonding of the other end of the joint piece to the skeleton member.

5. The method as defined in any one of the preceding claims 1 to 3, wherein the fusion-bondable portion is a resistance-weldable portion, and the step of fusion-bonding is the step of resistance welding the joint piece to the skeleton member.

6. The method as defined in claim 5, wherein the joint piece is a cylindrical article and the bore thereof has a blind bottom, and the resistance-weldable portion is after-treated into a shape to facilitate a final step of resistance welding the Joint piece to the skeleten member, after the Ni—Ti alloy part has been inserted in the bore and the peripheral wall thereof has subsequently been caulked.

7. The method as defined in claim 5, wherein the fitting of the Ni—Ti alloy part in the bore of the joint piece and the subsequent caulking of the peripheral wall onto the end of the Ni—Ti alloy part are done before the fusion bonding of the other end of the joint piece to the skeleton member.

8. The method as defined in any one the preceding claims 1 to 3, wherein the fusion-bondable portion is a resistance-brazeable portion, and the step of fusion bonding is the step of resistance brazing the joint piece to the skeleton member.

9. The method as defined in claim 8, wherein the joint piece is a cylindrical article and a bore thereof has a blind bottom, and the resistance-brazeable portion is after-treated into a shape to facilitate the final step of resistance brazing the joint piece to the skeleten member, after the Ni—Ti alloy part has been inserted in the bore and the peripheral wall thereof has subsequently been caulked.

10. The method as defined in claim 8, wherein a fitting of the Ni—Ti alloy part in the bore of the joint piece and the subsequent caulking of the peripheral wall onto the end of the Ni—Ti alloy part are done before the fusion bonding of the other end of the joint piece to the skeleton member.

* * * * *